(12) United States Patent
Yu

(10) Patent No.: US 7,684,189 B2
(45) Date of Patent: Mar. 23, 2010

(54) PORTABLE ELECTRONIC DEVICE FOR LOCKING UP LOCKING COMPONENT

(75) Inventor: Chiang-Chang Yu, Taipei (TW)

(73) Assignee: Sinox Co., Ltd., Taipei (TW)

( * ) Notice: Subject to any disclaimer, the term of this patent is extended or adjusted under 35 U.S.C. 154(b) by 2 days.

(21) Appl. No.: 12/105,220

(22) Filed: Apr. 17, 2008

(65) Prior Publication Data

US 2008/0276665 A1 Nov. 13, 2008

Related U.S. Application Data

(60) Provisional application No. 60/907,812, filed on Apr. 18, 2007.

(51) Int. Cl.
*G06F 1/16* (2006.01)
(52) U.S. Cl. .................................................. 361/679.57

(58) Field of Classification Search ............. 361/679.57
See application file for complete search history.

(56) References Cited

U.S. PATENT DOCUMENTS

| 5,757,616 | A | * | 5/1998 | May et al. | 361/679.57 |
| 5,870,281 | A | * | 2/1999 | Kim | 361/679.57 |
| 2005/0204786 | A1 | * | 9/2005 | Meyer et al. | 70/58 |
| 2007/0091556 | A1 | * | 4/2007 | Wu | 361/683 |
| 2008/0110217 | A1 | * | 5/2008 | Andrews et al. | 70/58 |
| 2009/0044578 | A1 | * | 2/2009 | Boss et al. | 70/57 |

* cited by examiner

*Primary Examiner*—Lisa Lea-Edmonds
(74) *Attorney, Agent, or Firm*—Schmeiser, Olsen & Watts LLP

(57) ABSTRACT

A portable electronic device for locking up a locking component is composed of a body having a fillister; and at least one locking axis disposed in the fillister for the locking component fastening together, so that the portable electronic device can be firmly connected to the locking component and a lock for an anti-theft purpose.

11 Claims, 3 Drawing Sheets

PORTABLE ELECTRONIC DEVICE FOR LOCKING UP LOCKING COMPONENT

CROSS-REFERENCE TO RELATED APPLICATIONS

This application claims priority to U.S. Provisional Application No. 60/907,812, which was filed on Apr. 18, 2007, the contents of which are incorporated herein by reference.

BACKGROUND OF THE INVENTION

1. Field of the Invention

The present invention generally relates to a portable electronic device, more particularly to a portable electronic device that firmly connects to a locking component and a lock so as to lock the portable electronic device for an anti-theft purpose.

2. Description of the Prior Art

Laptop computers are popular because of their light weight, slim size and convenience to carry. Due to the value of laptop computers, almost every one of them is equipped with a locking hole for a locking component to insert into. The dimensions of the locking hole are standard on the body of a laptop computer so as to fit with the locking component. Therefore, a laptop computer is locked through the locking component to prevent it from being easily moved or even stolen.

The locking hole is disposed at the case of the laptop computer. According to the considerations of light weight and manufacture, etc., the material of the case is mostly plastic, which is easily damaged. Consequently, even the laptop computer is equipped with the locking component and firmly connected to a lock, the locking hole is still damaged very easily so as to cause the laptop computer to be stolen.

SUMMARY OF THE INVENTION

The primary objective of the present invention is to provide a portable electronic device with a connecting structure for connecting to a locking component.

The portable electronic device mainly comprises a body having a fillister, and one or two locking axes being disposed on the inner surface of the fillister. The locking axis is to lock the locking component in order to lock the portable electronic computer with a lock for an anti-theft purpose.

Wherein the locking axis disposed in the fillister 12 may be made of a metal material with a better rigidity or other composites in order to promote the ability of anti-damage.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 1:
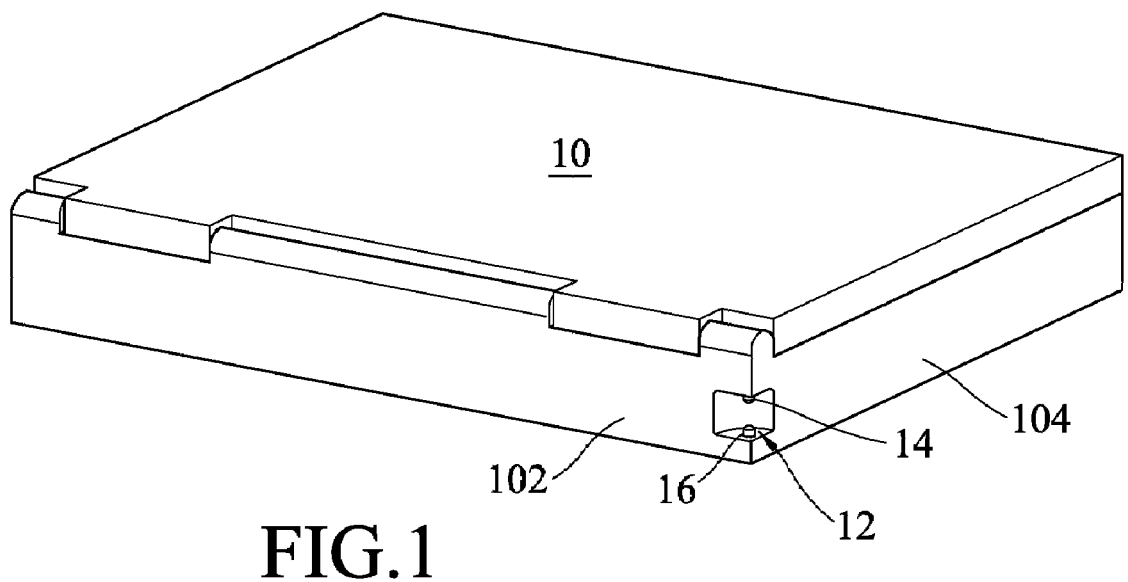
FIG. 1 illustrates a schematic view of an application to a laptop computer of a first preferred embodiment of the present invention.
Figure 2:
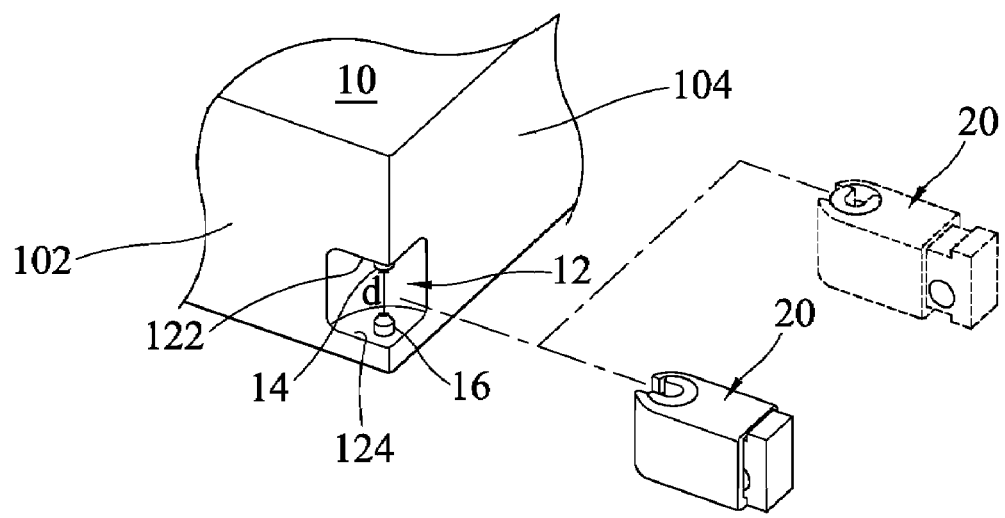
FIG. 2 illustrates a partial amplified schematic view of the first preferred embodiment, wherein a locking component is included.

With references to FIG. 1 and FIG. 2, which individually illustrate a schematic view of an application to a laptop computer of a first preferred embodiment of the present invention and a partial amplified schematic view of the first preferred embodiment, wherein a locking component is included. As shown in the figures, the portable electronic device includes a body 10, which has a fillister 12 indented into the surface of the body 10. The fillister 12 is randomly disposed at one of the surfaces of the body 10 or a place where the two surfaces 102 and 104 of the body 10 are connected each other. A top surface 122 and a bottom surface 124 of the fillister 12 are individually disposed a locking axis 14 and another locking axis 16. The two locking axes 14 and 16 are individually and coaxially installed at the two surfaces of the fillister 12. The two surfaces are corresponding each other. The all ends of the two locking axes 14 and 16 have a distance d between each other. In other words, the locking axes 14 and 16 are not connected with each other.

Wherein the locking axes 14 and 16 are extruded from the surfaces of the fillister 12 and shaped as two cylindrical or other geometrical members, such as cuboid or polygonal members.

Referring to FIG. 2, which illustrates the locking component 20 locked in the fillister 12 as well. The locking state of the locking component 20 is shown as the locking component 20 with the doted lines; on the other hand, the unlocking state of the locking component 20 is shown as the locking component 20 with the solid lines. While in the unlocking state, the locking component 20 can be inserted into the fillister 12 and then changed to the locking state in order to fasten the locking axes 14 and 16. As a result, the locking component 20 is firmly connected to the body 10.

Figure 3A:
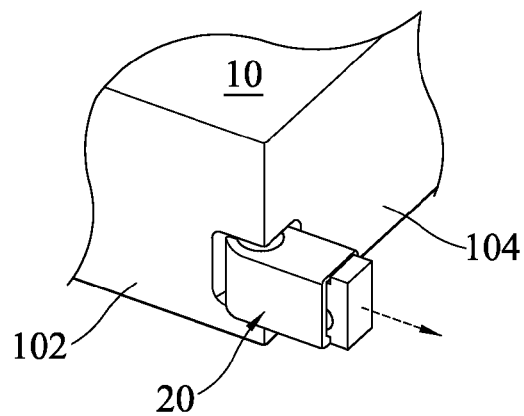
FIG. 3A illustrates a partial amplified schematic view of the first preferred embodiment, wherein the locking component is in an unlocking state.
Figure 3B:
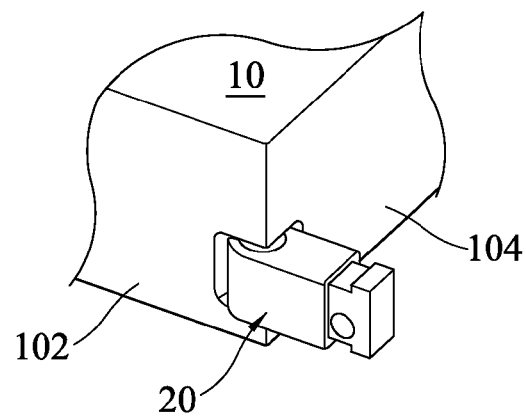
FIG. 3B illustrates a partial amplified schematic view of the first preferred embodiment, wherein the locking component is in a locking state.
Figure 3C:
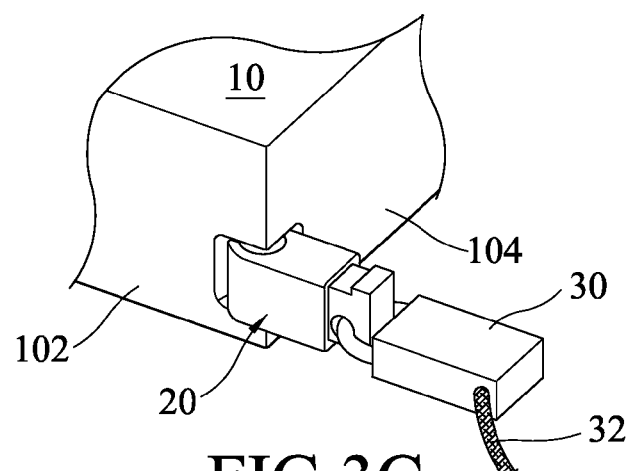
FIG. 3C illustrates a partial amplified schematic view of the first preferred embodiment, wherein the locking component is fastened to a lock.

With references to FIGS. 3A, 3B and 3C, which respectively illustrate a partial amplified schematic view of the first preferred embodiment, wherein the locking component is in an unlocking state, a partial amplified schematic view of the first preferred embodiment, wherein the locking component is in a locking state, a partial amplified schematic view of the first preferred embodiment, wherein the locking component is fastened to a lock. The locking component 20 is in the unlocking state and inserted into the fillister 12, as shown in FIG. 3A. After changing to the locking state, the front ends of the locking component 20 are able to fasten the locking axes 14 and 16, as shown in FIG. 3B. Thus the locking component 20 is firmly connected to the body 10. Continuously, a padlock 30 with a cable 32 and the locking component 20 are fastened together, as shown in FIG. 3C. Thus, the locking component 20 keeps the state of locking for fastening the two locking axes 14 and 16. Further, the body 10 can be firmly locked at a fixed object by means of the padlock 30 and the cable 32.

Figure 4:
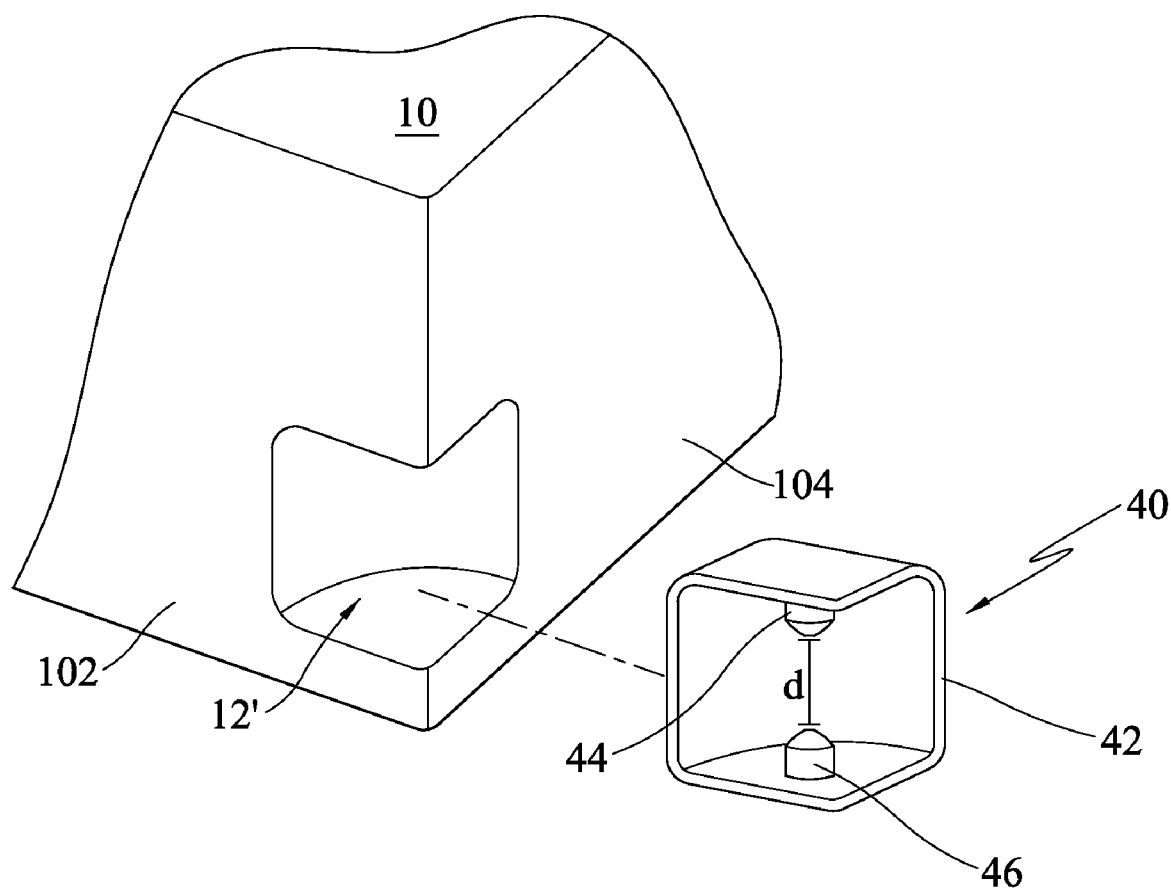
FIG. 4 illustrates a partial amplified schematic view of a second preferred embodiment, wherein a female-fastening member is included.

In practice, the two locking axes 14 and 16 are not only embedded in the fillister 12 of the body 10, but also installed in a female-fastening member 40, as shown in FIG. 4, which illustrates a partial amplified schematic view of a second preferred embodiment, wherein the female-fastening member is included. The female-fastening member 40 has a frame 42 so as to be embedded in a fillister 12' of the body 10. The two locking axes 44 and 46 are individually and coaxially installed at the two surfaces of the frame 42. The two surfaces are corresponding with each other. The two locking axes 44 and 46 are exposed in the fillister 12', and the ends of the two locking axes 44 and 46 have a distance d to each other.

Wherein the frame 42 of the female-fastening member 40 functions to firmly connect the female-fastening member 40 to the fillister 12' through the way of cohesiveness or lock. Furthermore, the frame 42 of the female-fastening member 40 can also be hidden in the body 10 via an inbuilt way.

Figure 5:
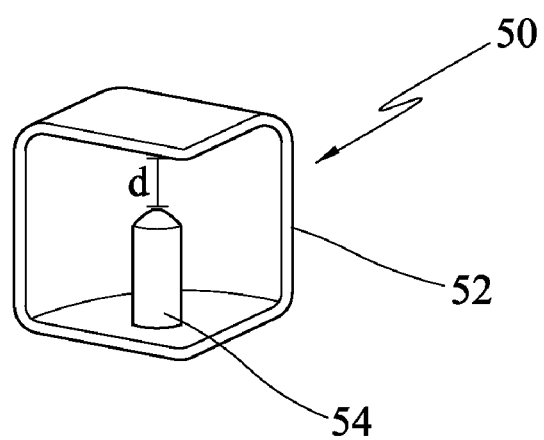
FIG. 5 illustrates a schematic view of a second preferred embodiment of the present invention.

With reference to FIG. 5, which illustrates a schematic view of a second preferred embodiment of the present invention. Comparing with the two locking axes 14 and 16 installed in the fillister 12 or the two locking axes 44 and 46 installed in the frame 42 of the female-fastening member 40, one-axis design can be another option. That is, only one locking axis 54 can be disposed in the fillister 12 or a frame 52 of a female-fastening member 50. The one end of the locking axis 54 is disposed at the fillister 12 or the surface of the frame 52, and the other end may keep a distance d from the fillister 12 or the surface of the frame 52.

In conclusion, the present invention can be used with a laptop computer or other portable electronic devices, so that the laptop computer or the other portable electronic devices may accept the locking component to firmly connect to the lock. Wherein the locking axis disposed in the fillister 12 or the female-fastening member 40 may be made of a metal material with a better rigidity or other composites in order to promote the ability of anti-damage.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A portable electronic device for locking up a locking component comprising:
   a body having a fillister; and
   a female-fastening member having a frame connected to the body and two locking axes installed at the frame, the two locking axes being individually and coaxially installed at the two surfaces of the frame, the two surfaces are corresponding each other, the two locking axes being exposed in the fillister, and all ends of the two locking axes having a distance from each other.

2. The portable electronic device for locking up the locking component according to claim 1, wherein the fillister is disposed at the surface of the body.

3. The portable electronic device for locking up the locking component according to claim 1, wherein the fillister is disposed at a place where the two surfaces are connected with each other.

4. The portable electronic device for locking up the locking component according to claim 1, wherein the frame is embedded in the fillister.

5. The portable electronic device for locking up the locking component according to claim 1, wherein the frame is hidden in the body.

6. The portable electronic device for locking up the locking component according to claim 1, wherein the frame defines a top surface and a bottom surface for the two locking axes being installed into.

7. A portable electronic device for locking up a locking component comprising:
   a body having a fillister; and
   a female-fastening member having a frame connected to the body and a locking axis installed at the frame, the one end of the locking axis being exposed in the fillister, and the other end of the locking axis and the surface of the fillister having a distance to each other.

8. The portable electronic device for locking up the locking component according to claim 7, wherein the fillister is disposed at the surface of the body.

9. The portable electronic device for locking up the locking component according to claim 7, wherein the fillister is disposed at a place where the two surfaces are connected with each other.

10. The portable electronic device for locking up the locking component according to claim 7, wherein the frame is embedded in the fillister.

11. The portable electronic device for locking up the locking component according to claim 7, wherein the frame is hidden in the body.

* * * * *